(12) United States Patent
Tamai

(10) Patent No.: US 12,537,902 B2
(45) Date of Patent: Jan. 27, 2026

(54) IMAGE READING DEVICE AND IMAGE READING METHOD

(71) Applicant: SEIKO EPSON CORPORATION, Tokyo (JP)

(72) Inventor: Kohei Tamai, Fukuchi-Machi (JP)

(73) Assignee: Seiko Epson Corporation, Tokyo (JP)

(*) Notice: Subject to any disclaimer, the term of this patent is extended or adjusted under 35 U.S.C. 154(b) by 207 days.

(21) Appl. No.: 18/412,551

(22) Filed: Jan. 14, 2024

(65) Prior Publication Data
US 2024/0244143 A1 Jul. 18, 2024

(30) Foreign Application Priority Data
Jan. 17, 2023 (JP) .................. 2023-004899

(51) Int. Cl.
H04N 1/04 (2006.01)
H04N 1/00 (2006.01)

(52) U.S. Cl.
CPC ..... *H04N 1/00013* (2013.01); *H04N 1/00466* (2013.01); *H04N 1/00588* (2013.01); *H04N 1/00602* (2013.01); *H04N 1/00623* (2013.01); *H04N 1/00689* (2013.01); *H04N 1/00716* (2013.01); *H04N 1/00779* (2013.01)

(58) Field of Classification Search
USPC ........................................ 358/496, 498, 474
See application file for complete search history.

(56) References Cited

U.S. PATENT DOCUMENTS

| 2018/0234578 | A1 | 8/2018 | Okawa et al. | |
| 2022/0038592 | A1* | 2/2022 | Fuji | H04N 1/00631 |
| 2023/0094383 | A1* | 3/2023 | Miyagi | H04N 1/00602 358/498 |
| 2023/0095138 | A1* | 3/2023 | Shuto | H04N 1/00628 271/264 |
| 2023/0097229 | A1* | 3/2023 | Koyanagi | H04N 1/00236 358/474 |
| 2023/0112819 | A1* | 4/2023 | Matsuyama | H04N 1/00771 358/1.12 |
| 2023/0247154 | A1* | 8/2023 | Igarashi | H04N 1/00535 358/498 |
| 2024/0015253 | A1* | 1/2024 | Noda | H04N 1/00615 |

FOREIGN PATENT DOCUMENTS

JP 2018-133697 A 8/2018

* cited by examiner

*Primary Examiner* — Cheukfan Lee
(74) *Attorney, Agent, or Firm* — WORKMAN NYDEGGER

(57) ABSTRACT

An image reading device includes a con driven by a motor, determines whether or not a second document subsequent to a first document is placed in a placement unit after start of driving of the motor and after the first document reaches a reading end position where reading by a reading unit ends, and when the second document is present, stops driving of the motor if a stop instruction for sopping the document at a specific position is received, and continues driving of the motor if the stop instruction is not received, and when the second document is absent, stops driving of the motor after the first document is discharged to a downstream of the conveyance roller.

11 Claims, 14 Drawing Sheets

ISH DEVICE AND IMAGE
READING METHOD

The present application is based on, and claims priority from JP Application Serial Number 2023-004899, filed Jan. 17, 2023, the disclosure of which is hereby incorporated by reference herein in its entirety.

BACKGROUND

1. Technical Field

The present disclosure relates to an image reading device and an image reading method.

2. Related Art

There is known a scanner that includes rollers for conveying a document to be read at a plurality of locations on a conveyance path and reads a document with an image sensor while conveying the document by rotating the rollers.

As a related art, there is known a document reading device in which a drive system for conveying a document is configured by a single drive motor, and all the rollers for conveying the document are driven by the single motor (see JP 2018-133697 A).

In a configuration in which conveyance from supply to discharge of the document is executed by moving each roller with one motor, the document may not be stopped at an appropriate position.

For example, it is assumed that, in response to receiving an instruction to cancel reading while a certain document is being read, reading is stopped, the document is discharged from a discharge port downstream of the image sensor, and conveyance is stopped. In this case, the next document on the upstream of the discharged document may be conveyed to the middle of the conveyance path and stopped. When the document stops at a position deep to some extent in the conveyance path, the user needs to take out the document from the conveyance path, which increases the time and effort for resuming the scanning.

There is a demand for improvement for stopping a document at an appropriate position in a case where the document being conveyed is stopped for some reason, including improvement for such a situation.

SUMMARY

An image reading device includes a motor, a placement unit at which a document is mounted,
a feed roller that receives power from the motor to rotate to convey the document placed at the placement unit in a predetermined conveying direction, a first conveyance roller that is provided downstream of the feed roller in the conveying direction and receives power from the motor to rotate to convey the document in the conveying direction, a second conveyance roller that is provided downstream of the first conveyance roller and receives power from the motor to rotate to convey the document in the conveying direction,
a reading unit that is provided between the first conveyance roller and the second conveyance roller in the conveying direction and reads the conveyed document,
a first detection unit that detects the document in the placement unit, and
a control unit, where the control unit determines, after start of driving of the motor and after a first document which is the document reaches a predetermined reading end position where reading by the reading unit ends, whether a second document that is a document subsequent to the first document is detected by the first detection unit, stops driving of the motor when a stop instruction for stopping the document at a specific position is received, and continues driving of the motor when the stop instruction is not received, in a case where the second document is detected by the first detection unit, and stops driving of the motor after the first document is discharged downstream of the second conveyance roller, in a case where the second document is not detected by the first detection unit.

An image reading device including a supporting portion that is placed at an installation surface and supports a main body, and the main body configured to switch a posture to a first posture or a second posture while being supported by the supporting portion, where the main body includes a motor, a placement unit on which a document is mounted,
a feed roller that receives power from the motor to rotate to convey the document placed at the placement unit in a predetermined conveying direction, a first conveyance roller that is provided downstream of the feed roller in the conveying direction and receives power from the motor to rotate to convey the document in the conveying direction, a second conveyance roller that is provided downstream of the first conveyance roller and receives power from the motor to rotate to convey the document in the conveying direction,
a reading unit that is provided between the first conveyance roller and the second conveyance roller in the conveying direction and reads the conveyed document,
a posture detection unit that detects whether the posture is the first posture or the second posture, a first discharge port that is provided downstream of the second conveyance roller and discharges the document that passed a curved path, a second discharge port that is provided downstream of the second conveyance roller and discharges the document that does not pass the curved path, and a control unit, the main body is configured to discharge the document from the first discharge port and not discharge the document from the second discharge port in the first posture, and configured to discharge the document from the second discharge port and not discharge the document from the first discharge port in the second posture, and when receiving an instruction to cancel reading after start of driving of the motor, the control unit stops driving of the motor if the first posture is detected by the posture detection unit, and continues driving of the motor, and stops driving of the motor after the document is discharged from the second discharge port if the second posture is detected by the posture detection unit.

An image reading method executed by an image reading device, the image reading device including,
a motor, a placement unit on which a document is mounted, a feed roller that receives power from the motor to rotate to convey the document placed at the placement unit in a predetermined conveying direction, a first conveyance roller that is provided downstream of the feed roller in the conveying direction and receives power from the motor to rotate to convey the document in the conveying direction, a second conveyance roller that is provided downstream of the first conveyance roller and receives power from the motor to rotate to convey the document in the conveying direction, and a reading unit that is provided between the first conveyance roller and the second conveyance roller in the conveying direction and reads the conveyed document, the image reading method including a determination step for determining, after start of driving of the motor and after a first document that is the document reaches a predetermined reading end position at which reading by the reading unit ends, presence or absence of a second document that is a document subsequent to the first document, on the placement unit, and a stop control step for, when it is determined that the second document is present, stopping driving of the motor if a stop instruction for stopping the document at a specific position is received, and continuing the driving of the motor when the stop instruction is not received, and when it is determined that the second document is absent, stopping driving of the motor after discharging the first document downstream of the second conveyance roller.

An image reading method executed by an image reading device, the image reading device including,
 a supporting portion that is placed at an installation surface and supports a main body, and the main body configured to switch a posture to a first posture or a second posture while being supported by the supporting portion, the main body including,
 a motor, a placement unit on which a document is mounted, a feed roller that receives power from the motor to rotate to convey the document placed at the placement unit in a predetermined conveying direction, a first conveyance roller that is provided downstream of the feed roller in the conveying direction and receives power from the motor to rotate to convey the document in the conveying direction, a second conveyance roller that is provided downstream of the first conveyance roller and receives power from the motor to rotate to convey the document in the conveying direction, a reading unit that is provided between the first conveyance roller and the second conveyance roller in the conveying direction and reads the conveyed document, a first discharge port that is provided downstream of the second conveyance roller and discharges the document that passed a curved path, a second discharge port that is provided downstream of the second conveyance roller and discharges the document that does not pass the curved path, and the main body configured to discharge the document from the first discharge port and not discharge the document from the second discharge port in the first posture, and configured to discharge the document from the second discharge port and not discharge the document from the first discharge port in the second posture, the image reading method including a determination step for determining whether the posture is the first posture or the second posture when receiving an instruction to cancel reading after start of driving of the motor, and a stop control step for stopping driving of the motor if the posture is the first posture, and continuing driving of the motor, and stopping driving of the motor after the document is discharged from the second discharge port if the posture is the second posture.

DESCRIPTION OF EMBODIMENTS

Embodiments of the present disclosure will be described below with reference to the drawings. Note that each figure is merely illustrative for describing the present embodiment. Since each drawing is an example, ratios and shapes may not be accurate, may not match each other, or may be partially omitted.

1. Overall Description of Device Configuration

Figure 1:
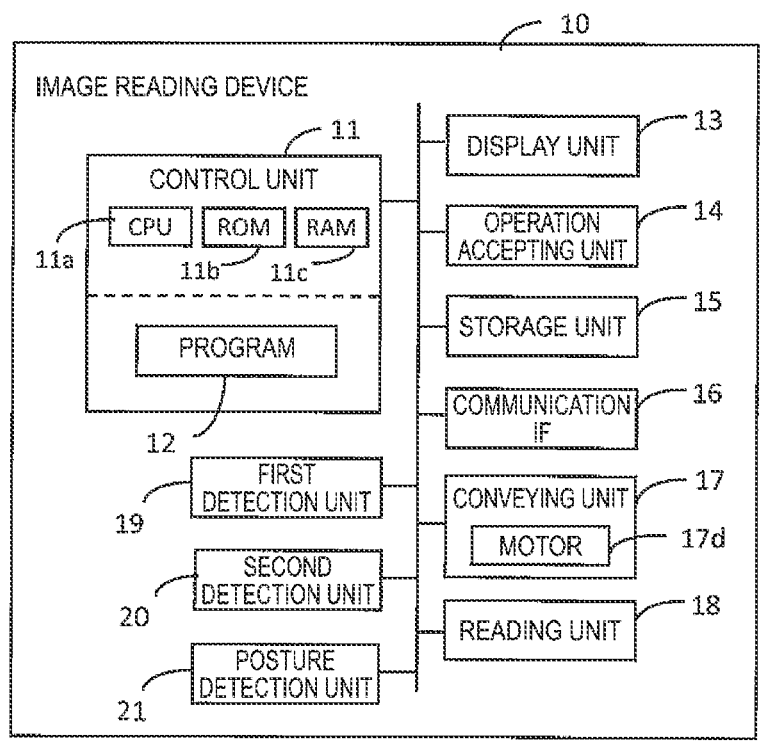
FIG. 1 is a diagram simply illustrating a device configuration.

FIG. 1 simply illustrates a configuration of an image reading device 10 according to the present embodiment. The image reading device 10 executes an image reading method. The image reading device 10 is a sheet feed type scanner, and includes a control unit 11, a display unit 13, an operation accepting unit 14, a storage unit 15, a communication IF 16, a conveying unit 17, a reading unit 18, a first detection unit 19, a second detection unit 20, a posture detection unit 21, and the like. Each of the first detection unit 19 and the second detection unit 20 is a sensor configured to detect a document. IF is an abbreviation for interface. The control unit 11 is configured by including one or a plurality of ICs each having a CPU 11a serving as a processor, a ROM 11b, a RAM 11c, and the like, other non-volatile memories, and the like.

In the control unit 11, the processor, that is, the CPU 11a executes arithmetic processing in accordance with a program 12 stored in the ROM 11b, the other memory, or the like, using the RAM 11c or the like as a work area, to realize a process according to the present embodiment. The processor is not limited to a single CPU, and a configuration may be adopted in which the process is executed by a hardware circuit such as a plurality of CPUs, an ASIC, or the like, or a configuration may be adopted in which the CPU and the hardware circuit work in cooperation to execute the process.

The display unit 13 is a means that displays visual information and is configured by, for example, a liquid crystal display, an organic EL display, or the like. The display unit 13 may include a display and a drive circuit for driving the display.

The operation accepting unit 14 is a means that receives an operation or an input by a user, and is realized, for example, by a physical button, a touch panel, a mouse, a keyboard, or the like. The operation accepting unit 14 serving as a touch panel is realized as a function of the display unit 13.

The display unit 13 and the operation accepting unit 14 may be peripheral devices externally coupled to the image reading device 10.

For example, the storage unit 15 is a storage means such as a hard disk drive, a solid state drive, and other memories. A portion of the memory included in the control unit 11 may be regarded as the storage unit 15. The storage unit 15 may be regarded as a portion of the control unit 11.

The communication IF 16 is a generic term for one or a plurality of IFs for executing communication with an external device (not shown) in a wired or wireless manner, in accordance with a predetermined communication protocol including a known communication standard. The external device is, for example, various types of terminals such as a personal computer, a server, a smartphone, and a tablet type terminal.

The conveying unit 17 is a means that conveys a document to be read along a predetermined conveyance path. The conveying unit 17 includes rollers to be described later that rotate to convey the document, a motor 17d serving as a power source for rotation, and the like. The conveying unit 17 also includes a so-called auto document feeder (ADF) function configured to sequentially convey a plurality of documents, which are placed at a document tray, one sheet at a time.

The reading unit 18 is a means that optically reads a document conveyed by the conveying unit 17. The reading unit 18 has a general configuration as a scanner, such as a light source that irradiates a document, an image sensor that receives reflected light or transmitted light from a document, converts the light photoelectrically to generate an electrical signal as a reading result, and outputs the electrical signal, an analog front end that converts the output from the image sensor to a digital signal to obtain image data, and the like. The image sensor of the reading unit 18 is a line sensor including a plurality of imaging elements arranged along the width direction intersecting the conveying direction, and reads an image of one line that is long in the width direction in one reading operation. The intersection between the conveying direction and the width direction may be understood to be orthogonal or substantially orthogonal. The reading unit 18 obtains two-dimensional image data by repeating reading of one line at a predetermined frequency. The width direction may be referred to as a main scanning direction, and the conveying direction may be referred to as a sub-scanning direction.

Figure 2:
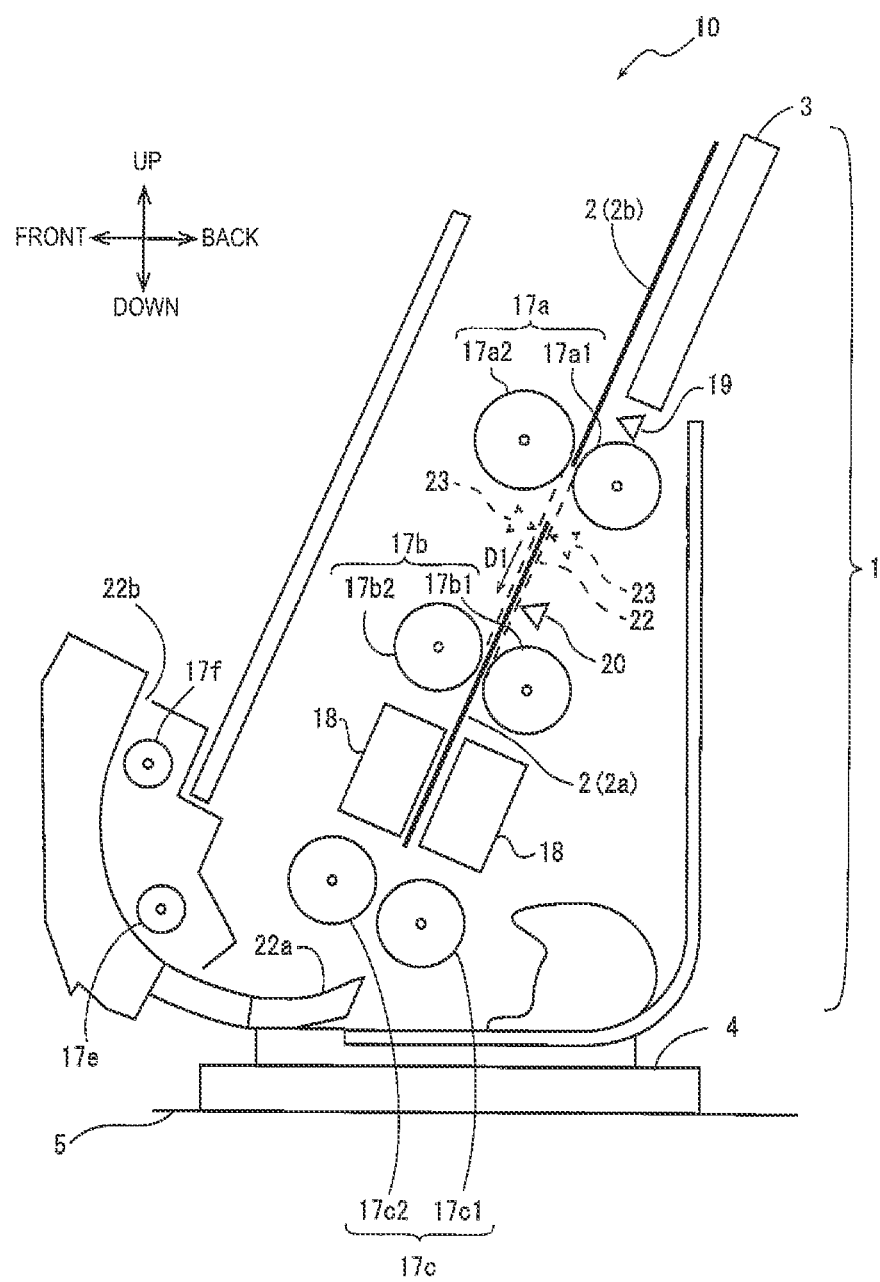
FIG. 2 is a diagram simply illustrating an internal configuration of an image reading device in a first posture from a side viewpoint.

FIG. 2 simply illustrates mainly an internal configuration of the image reading device 10 from a side viewpoint. It can be said that FIG. 2 is a view from a viewpoint facing the width direction. FIG. 2 illustrates the up-down and front-back directions of the image reading device 10. The image reading device 10 includes a placement unit 3 for placing the document 2 on the rear side and the upper side. The placement unit 3 is a document tray. The conveying unit 17 conveys the document 2 placed in the placement unit 3 on a conveyance path 22 directed substantially forward and downward from the placement unit 3. The conveying unit 17 includes a feed roller pair 17a, a conveyance roller pair 17b, and a discharge roller pair 17c as rollers. The roller pair is a pair of rollers arranged to face each other so as to sandwich the conveyance path 22, and conveys the document 2 by rotating in a state where the document 2 is sandwiched by rollers forming a pair. The conveyance path 22 is a path and a space of the document 2, but is actually formed by members such as rollers serving as the conveying unit 17 and a platen (not illustrated). In FIG. 2, a part of the conveyance path 22 is very simply indicated by a broken line.

The feed roller pair 17a is configured by rollers 17a1 and 17a2 arranged to face each other. The conveyance roller pair 17b is configured by rollers 17b1 and 17b2 arranged to face each other, and the discharge roller pair 17c is configured by the rollers 17c1 and 17c2 arranged to face each other. Although not illustrated in FIG. 2, for example, the roller 17a1, the roller 17b1, and the roller 17c1 arranged on the lower side of the conveyance path 22 are each coupled to one motor 17d, and rotate by power given from the motor 17d. However, the rollers of the conveying unit 17 merely need to be able to convey the document 2, and it is not essential to be a roller pair.

A direction along the conveyance path 22 is a conveying direction D1. The conveying unit 17 conveys the document 2 in the conveying direction D1. Upstream and downstream in the conveying direction D1 are simply referred to as upstream and downstream. In the present embodiment, an end facing the downstream of the document 2 is referred to as as a "leading end", and an end facing the upstream of the document 2 is referred to as a "trailing end". The conveyance path 22 may be partially curved. Therefore, the direction of the conveying direction D1 along the conveyance path 22 also changes in at least a part of the stroke from upstream to downstream. The feed roller pair 17a is disposed at a position close to the placement unit 3, and draws the document 2 from the placement unit 3 into the conveyance path 22 in units of one sheet. The feed roller pair 17a and the rollers 17a1 and 17a2 constituting the feed roller pair 17a correspond to a specific example of a "feed roller" that conveys the document 2 placed in the placement unit 3 in the conveying direction D1.

The conveyance roller pair 17b and the rollers 17b1 and 17b2 constituting the conveyance roller pair 17b correspond to a specific example of a "first conveyance roller" that is provided downstream of the feed roller and conveys the document 2 in the conveying direction D1. The discharge roller pair 17c and the rollers 17c1 and 17c2 constituting the discharge roller pair 17c correspond to a specific example of a "second conveyance roller" that is provided downstream of the first conveyance roller and conveys the document 2 in the conveying direction D1. The reading unit 18 is provided at a position downstream of the conveyance roller pair 17b and upstream of the discharge roller pair 17c.

The first detection unit 19 is provided in the vicinity of the placement unit 3 and detects the document 2 in the placement unit 3. The first detection unit 19 outputs an ON signal indicating the presence of the document in a state where the document 2 has been detected, and outputs an OFF signal indicating the absence of the document in a state where the document 2 has not been detected. The second detection unit 20 is provided at a position downstream of the feed roller pair 17a and upstream of the conveyance roller pair 17b, and detects the document 2. Specifically, the second detection unit 20 is provided between a position at which the feed roller pair 17a comes into contact with the document 2 and a position at which the conveyance roller pair 17b comes into contact with the document 2 in the conveying direction D1. The position where the roller pair comes into contact with the document 2 is a position where the roller pair sandwiches the document 2. Similar to the first detection unit 19, the second detection unit 20 outputs an ON signal indicating the presence of the document in a state where the document 2 has been detected, and outputs an OFF signal indicating the absence of the document in a state where the document 2 has not been detected.

In the example of FIG. 2, the reading unit 18 is provided so as to sandwich the conveyance path 22, and can simultaneously read both sides of the document 2. In other words, the reading unit 18 reads the upper surface of the document 2 with an image sensor provided above the conveyance path 22, and reads the lower surface of the document 2 with an image sensor provided below the conveyance path 22. However, it is not essential that the image reading device 10 is a product configured to read both sides of the document 2, and the image reading device 10 may be a product configured to read only one of both sides of the document 2.

The main body 1 of the image reading device 10 includes the configurations illustrated in FIG. 1 and the configurations described above with reference to FIG. 2. The main body 1 is a concept including each of these configurations and a housing having each of the configurations. In the example of FIG. 2, the image reading device 10 further includes a supporting portion 4. The supporting portion 4 is placed at the installation surface 5 and supports the main body 1. The posture of the main body 1 in FIG. 2 corresponds to a "first posture".

According to FIG. 2, the main body 1 has a curved path 22a as a part of the conveyance path 22. The curved path 22a is a portion of the conveyance path 22 downstream of the discharge roller pair 17c and is curved in a substantially U-shape. An outlet of the curved path 22a is directed upward in front of the main body 1, and serves as a first discharge port 22b for discharging the document 2 that passed through the curved path 22a. That is, in the course of passing through the curved path 22a, the document 2 conveyed downstream by the discharge roller pair 17c makes a U-turn with respect to the direction before passing through the curved path 22a, and is discharged from the first discharge port 22b. In this manner, discharging the document 2 from the first discharge port 22b is referred to as "U-turn discharge". On the downstream of the discharge roller pair 17c, several rollers 17e and 17f for guiding and discharging the document 2 along the curved path 22a may be arranged on the curved path 22a. The rollers 17e and 17f are also rotated by power from the motor 17d.

2. First Embodiment

Next, a first embodiment of the image reading device 10 will be described.

Figure 3:
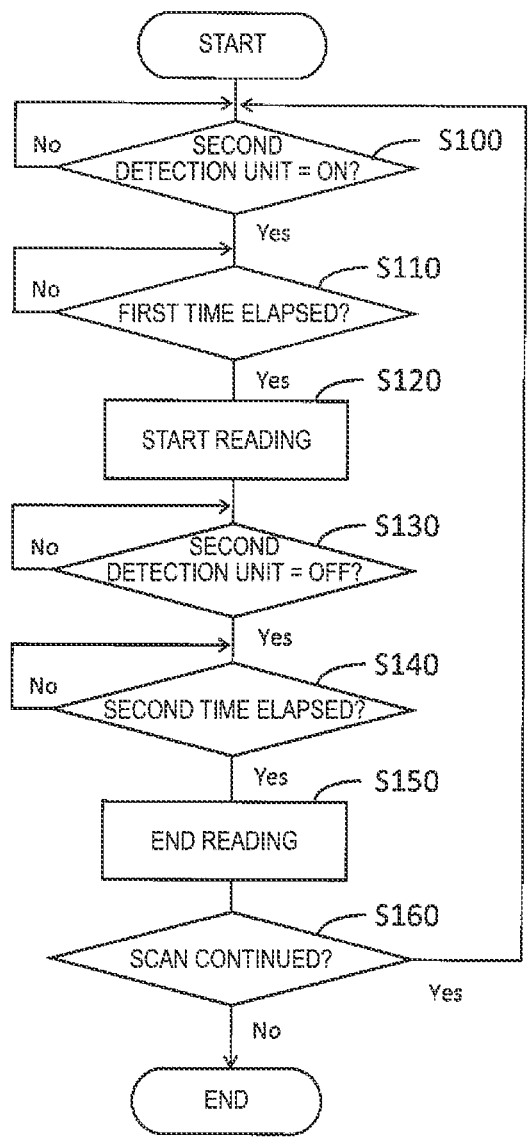
FIG. 3 is a flowchart illustrating an image reading process according to a first embodiment.

FIG. 3 is a flowchart illustrating an image reading process executed by the control unit 11 according to the program 12 in the first embodiment.

Figure 4:
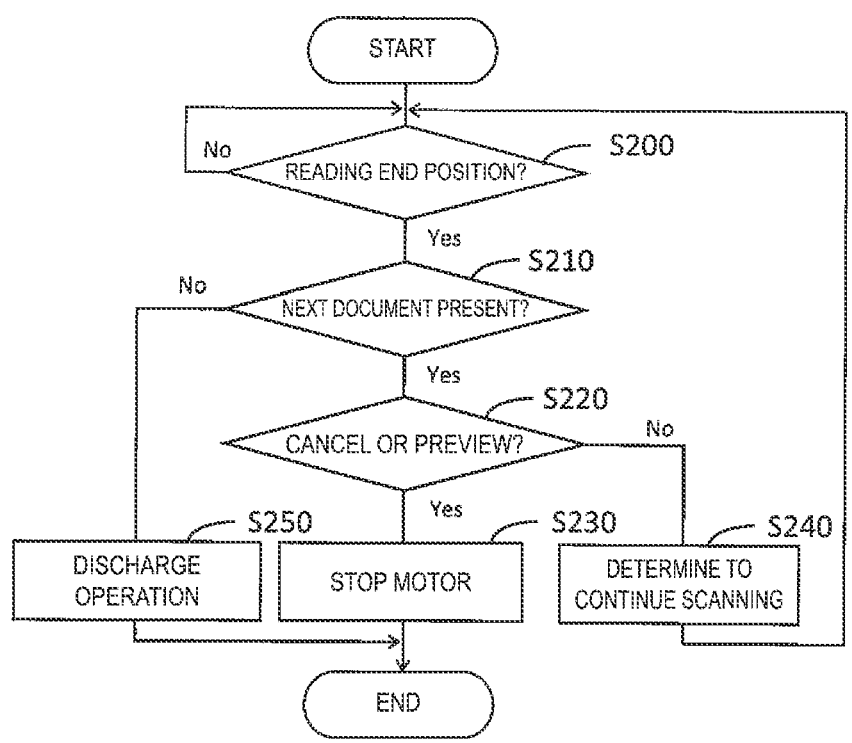
FIG. 4 is a flowchart illustrating a stop control process according to the first embodiment.

FIG. 4 is a flowchart illustrating stop control processing executed by the control unit 11 according to the program 12 in the first embodiment. The description of each flowchart is the description of the image reading method. The control unit 11 performs each flowchart of FIGS. 3 and 4 in parallel. Each flowchart merely illustrates a part of process that can be executed by the control unit 11.

The user operates the operation accepting unit 14 or an external device to instruct the image reading device 10 to start scanning the document 2. When the document 2 is placed in the placement unit 3, that is, when the output of the first detection unit 19 is an ON signal, the control unit 11 that has received the instruction to start scanning starts driving of the motor 17d and causes the conveying unit 17 to start the process of conveying one sheet of document 2 from the placement unit 3. The control unit 11 starts the flowcharts of FIGS. 3 and 4 with the start of conveyance of the first document 2 from the placement unit 3.

In step S100 of FIG. 3, the control unit 11 continuously determines whether or not the output of the second detection unit 20 is the ON signal, and proceeds the process from the determination of "Yes" to step S110 when the output is the ON signal. That is, when the leading end of the document 2 passes the position of the second detection unit 20, the output of the second detection unit 20 is switched from the OFF signal to the ON signal, and "Yes" is determined in step S100.

In step S110, the control unit 11 determines whether or not a predetermined first time has elapsed from the determination of "Yes" in step S100, determines "Yes" at the timing when the first time has elapsed, and proceeds the process to step S120.

In step S120, the control unit 11 causes the reading unit 18 to start reading. The first time is generally a time during which the leading end of the document 2 is conveyed from the second detection unit 20 to the reading unit 18, or a time shorter than such a time. The first time is determined in advance based on the distance from the second detection unit 20 to the reading unit 18 in the conveyance path 22 and the conveyance speed of the conveying unit 17. Note that the first time may be 0.

After causing the reading unit 18 to start reading in step S120, the control unit 11 continuously determines in step S130 whether or not the output of the second detection unit 20 is an OFF signal, and proceeds from the determination of "Yes" to step S140 if the output is the OFF signal. When the trailing end of the document 2 passes the position of the second detection unit 20, the output of the second detection unit 20 is switched from the ON signal to the OFF signal, and "Yes" is determined in step S130.

In step S140, the control unit 11 determines whether or not a predetermined second time has elapsed from the determination of "Yes" in step S130, determines "Yes" at the timing when the second time has elapsed, and proceeds the process to step S150.

In step S150, the control unit 11 causes the reading unit 18 to end the reading. The second time is a time required from when the trailing end of the document 2 passes through the second detection unit 20 until when the trailing end finishes passing through the reading unit 18, and is determined in advance. Therefore, when the reading unit 18 ends the reading in step S150, all the reading from the leading end to the trailing end of the document 2 is ended.

As a result of the reading performed by the reading unit 18 starting in step S120 and ending in step S150, image data worth one page of the document 2 is generated. Needless to say, the control unit 11 can perform predetermined post-processing on such image data. The predetermined post-processing mentioned here is, for example, various image processing, storage in the storage unit 15 or another memory, transfer to an external device via the communication IF 16, printing by a printing function (not illustrated), electronic mail transmission by an electronic mail function (not illustrated), or facsimile transmission by a facsimile function (not illustrated).

In step S160, the control unit 11 determines whether or not to continue scanning. The scan continuation refers to conveyance or reading of the next document 2. The continuation of scanning will be described later with reference to FIG. 4. In a case where the scanning is continued, the control unit 11 proceeds from "Yes" in step S160 to the determination in step S100, and in a case where the scanning is not continued, the flowchart in FIG. 3 is ended from "No" in step S160.

In step S200 of FIG. 4, the control unit 11 continuously determines whether or not the document 2 has reached a predetermined "reading end position" at which reading by the reading unit 18 ends. Since the reading end position can be regarded as the position of the document 2 when the trailing end of the document 2 passes through the reading unit 18, it can be said that the document 2 is at the reading end position when the reading is ended in step S150 of FIG. 3. Therefore, the determination of "Yes" in step S140 and the determination of "Yes" in step S200 are substantially the same.

In order to distinguish a plurality of documents 2, when focusing on one document 2 and calling it a "first document 2a", the document 2 subsequent to the first document 2a is called a "second document 2b". Furthermore, the document 2 subsequent to the second document 2b is referred to as a "third document 2c". In the example of FIG. 2, the document 2 being conveyed and being read is regarded as a first document 2a, and the document 2 being placed in the placement unit 3 is regarded as a second document 2b.

After the determination of "Yes" in step S200, the control unit 11 determines the presence or absence of the next document 2 in step S210. That is, when the output of the first detection unit 19 is the ON signal, it can be said that the next document 2 is present in the placement unit 3, and thus the control unit 11 determines "Yes" in step S210 and proceeds to step S220. On the other hand, when the output of the first detection unit 19 is the OFF signal, it can be said that the next document 2 is not present in the placement unit 3, and thus determination is made as "No" in step S210, and the process proceeds to step S250.

Such steps S200 and S210 correspond to a "determination step" of determining the presence or absence of the second document 2b in the placement unit 3 after the driving of the motor 17d has started and after the first document 2a has reached the reading end position.

When determined as "No" in step S210, the control unit 11 causes the conveying unit 17 to execute the discharge operation of the document 2 determined to have reached the reading end position in step S200 (step S250) and ends the flowchart of FIG. 4. The discharge operation is a process of discharging the document 2 from the discharge port downstream of the discharge roller pair 17c and then stopping the driving of the motor 17d. In the example of FIG. 2, the document 2 is discharged from the first discharge port 22b.

Figure 5:
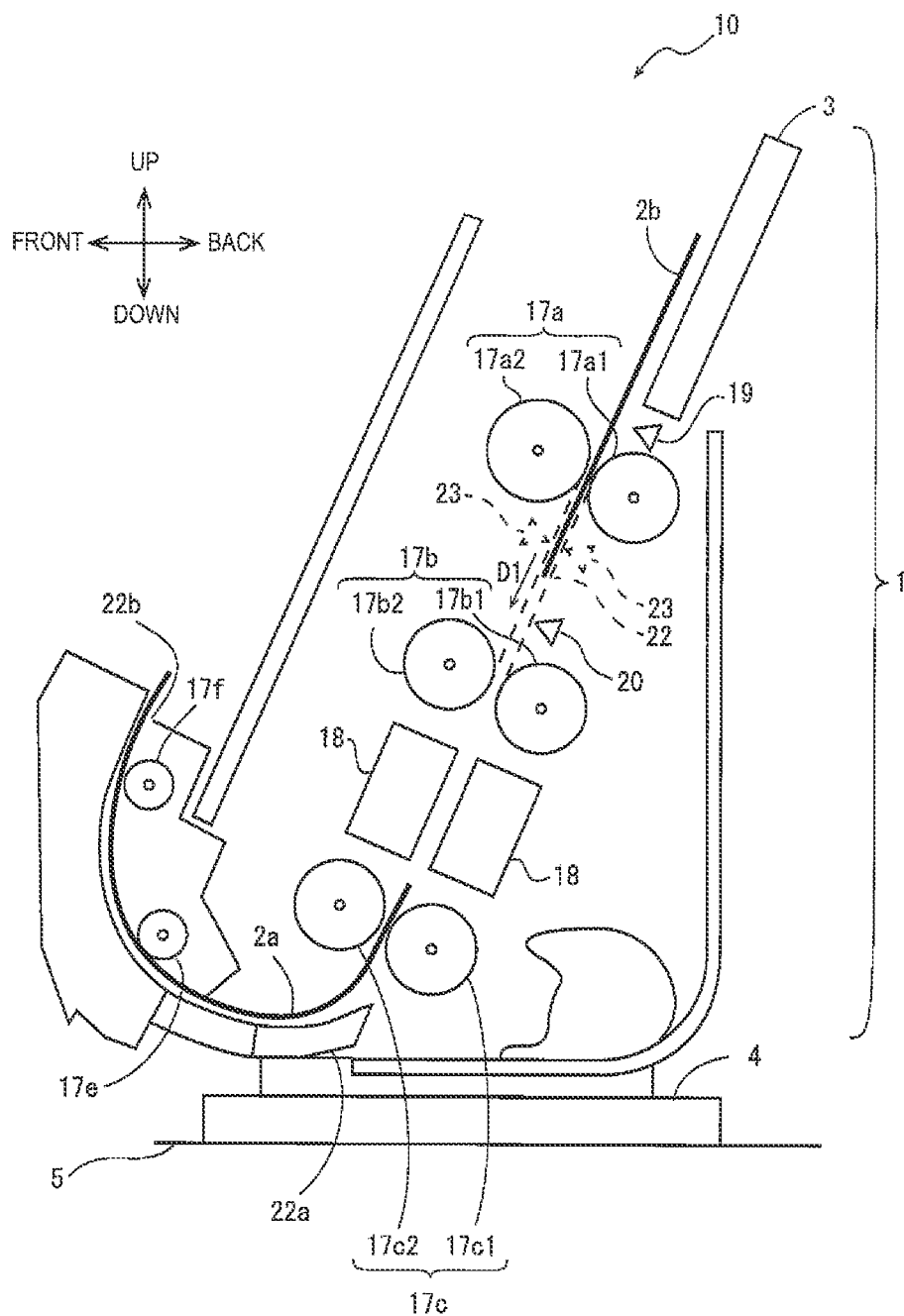
FIG. 5 is a diagram simply illustrating a state in which a first document is at a reading end position and a second document is at a pre-reading position from a side view point.

Similarly to FIG. 2, FIG. 5 simply illustrates mainly an internal configuration of the image reading device 10 from a side viewpoint. In FIG. 5 and FIGS. 6, 7, 8, and 9 to be described later, the description common to FIG. 2 will be appropriately omitted. According to FIG. 5, each of the first document 2a and the second document 2b advances toward the downstream than the position illustrated in FIG. 2.

Specifically, in FIG. 5, the first document 2a is at the reading end position, and the vicinity of the trailing end is sandwiched by the discharge roller pair 17c. In addition, the leading end of the second document 2b is advanced toward the downstream than the feed roller pair 17a and is at a position of not reaching the second detection unit 20. That is, FIG. 5 illustrates a state of a time point at when determination is made as "Yes" in step S200 for the first document 2a. In the state of FIG. 5, it is naturally determined as "Yes" in step S210.

When FIGS. 2 and 5 are compared, it is understood that the first document 2a is conveyed by a larger distance than the second document 2b in the process of transition from FIGS. 2 to 5. This is due to a difference in the conveyance amount per unit time between the feed roller pair 17a and the other rollers. That is, each roller rotates by receiving power from the motor 17d, but the feed roller pair 17a is designed so that a conveyance amount per unit time is small as compared with that of the conveyance roller pair 17b or the discharge roller pair 17c.

In step S220, the control unit 11 determines whether or not a cancel instruction or a preview instruction is received. The cancel instruction is an instruction to cancel reading. The preview instruction is an instruction for preview to display the reading result of the document 2 on a predetermined screen. The predetermined screen is a screen of an external device, but may be the display unit 13. The cancel instruction and the preview instruction can be arbitrarily performed via a UI screen in the external device or the operation accepting unit 14. UI is an abbreviation for user interface. The user can arbitrarily instruct the image reading device 10 to cancel during a period from when arbitrarily instructing the image reading device 10 to start scanning the document 2 until when a predetermined post-process on the image data serving as the reading result is ended.

Therefore, if the cancel instruction or the preview instruction is received by the time point when the determination in step S220 is performed, the control unit 11 determines "Yes" in step S220 and proceeds to step S230. On the other hand, if neither the cancel instruction nor the preview instruction has been received by the time point when the determination in step S220 is performed, the control unit 11 determines "No" in step S220 and proceeds to step S240. The cancel instruction and the preview instruction correspond to a "stop instruction" for stopping the document 2 at a specific position. The specific position mentioned here is a concept including several positions such as a reading end position, a position after discharge by the discharge port, and a position before reading by the reading unit 18.

In step S230, the control unit 11 stops the driving of the motor 17d and ends the flowchart of FIG. 4. When ending the flowchart in step S230, the document 2 determined to have reached the reading end position in step S200 is stopped at the reading end position as it is. The next document 2 is also stopped at the position at that time.

That is, when determined as "Yes" in step S220 in the state illustrated in FIG. 5, the first document 2a is stopped at the reading end position as it is, and the second document 2b is stopped at a position where the leading end has not reached the second detection unit 20. As illustrated in FIG.

5, the position of the second document 2b at where the leading end is located between the feed roller pair 17a and the conveyance roller pair 17b and upstream of the second detection unit 20 in the conveying direction D1 corresponds to the "pre-reading position".

Although not specifically shown in the flowchart, when receiving the cancel instruction, the control unit 11 causes the reading unit 18 to stop reading, and can discard the image data generated between the reception of the scan start instruction and the reception of the cancel instruction. In addition, the post-processing described later is not executed. In addition, when receiving the preview instruction, the control unit 11 may display, on a predetermined screen, a preview of image data obtained by reading that has been executed by the time point of step S220.

In step S240, the control unit 11 determines to continue scanning, and returns to the determination in step S200. When the scan continuation is determined in step S240, the determination in step S160 in FIG. 3 becomes "Yes". When scan continuation is determined, the driving of the motor 17d is naturally continued, and the document 2 that has reached the reading end position is conveyed as it is and eventually discharged from the discharge port, and the next document 2 is also conveyed as it is, and the leading end eventually reaches the second detection unit 20 and determination is made as "Yes" in step S100. On the other hand, when determination is made as "No" in step S210 or when determination is made as "Yes" in step S220, the determination of step S160 becomes "No".

Such steps S220, S230, S240, and S250 correspond to a "stop control step" in which when it is determined that the second document 2b is present (step S210 "Yes"), the driving of the motor 17d is stopped if the stop instruction is received, the driving of the motor 17d is continued if the stop instruction is not received, and on the other hand, when it is determined that the second document 2b is not present (step S210 "No"), the first document 2a is discharged downstream of the second conveyance roller, and then the driving of the motor 17d is stopped.

The stop instruction may be assumed to be only a cancel instruction or only a preview instruction. That is, in step S220, the control unit 11 may branch to Yes/No depending on whether or not the cancel instruction has been received by that time point. Alternatively, in step S220, the control unit 11 may branch to Yes/No depending on whether or not a preview instruction has been received by that time point.

3. Summary of First Embodiment

As described above, according to the first embodiment, the image reading device 10 includes the motor 17d, the placement unit 3 on which the document 2 is placed, the feed roller that receives power from the motor 17d and rotates to convey the document 2 placed in the placement unit 3 in the predetermined conveying direction D1, the first conveyance roller that is provided downstream of the feed roller in the conveying direction D1 and rotates by receiving power from the motor 17d to convey the document 2 in the conveying direction D1, the second conveyance roller that is provided downstream of the first conveyance roller and rotates by receiving power from the motor 17d to convey the document 2 in the conveying direction D1, the reading unit 18 that is provided between the first conveyance roller and the second conveyance roller in the conveying direction D1 and reads the conveyed document 2, the first detection unit 19 that detects the document 2 in the placement unit 3, and the control unit 11. When whether or not the second document 2b, which is the document 2 subsequent to the first document 2a, is detected by the first detection unit 19 is determined after the start of the driving of the motor 17d and after the first document 2a, which is the document 2, has reached a predetermined reading end position at where the reading by the reading unit 18 is ended, and the second document 2b is detected by the first detection unit 19, the control unit 11 stops the driving of the motor 17d if a stop instruction for stopping the document 2 at a specific position is received, and continues the driving of the motor 17d if the stop instruction is not received, and when the second document 2b is not detected by the first detection unit 19, the control unit 11 discharges the first document 2a downstream of the second conveyance roller and stops driving of the motor 17d.

According to the configuration described above, in the image reading device 10 in which the rollers are rotated by one motor 17d to convey the document 2 in the conveying direction D1, if the second document 2b is present when the first document 2a has reached the reading end position, the driving of the motor 17d is stopped in response to a stop instruction such as a cancel instruction. Therefore, when the stop instruction is received, further conveyance of the second document 2b can be suppressed. Therefore, the amount of time and effort for the user to take out the second document 2b from the conveyance path 22 is reduced, and the amount of time and effort for resuming the scanning is also reduced. This means that the document 2 is stopped at an appropriate position.

The stop instruction may be an instruction to cancel reading.

According to the configuration described above, when the user instructs cancellation at an arbitrary timing in a process of the image reading device 10 sequentially conveying the plurality of documents 2, further conveyance of the document 2 that has reached the reading end position or the document 2 that is located upstream of the reading end position can be suppressed, and the time and effort of the user can be reduced as described above.

The stop instruction may be an instruction for a preview for displaying a reading result of the document 2 on a predetermined screen.

According to the configuration described above, when the user instructs preview at an arbitrary timing in a process of the image reading device 10 sequentially conveying the plurality of documents 2, further conveyance of the document 2 that has reached the reading end position or the document 2 that is located upstream of the reading end position can be suppressed, and the time and effort of the user can be reduced as described above.

When the second document 2b is detected by the first detection unit 19, the control unit 11 stops the driving of the motor 17d if the stop instruction is received to stop the first document 2a at the reading end position, and stops the second document 2b at the pre-reading position at where the end facing the downstream of the document 2 is located between the feed roller and the first conveyance roller in the conveying direction D1 and on the upstream of the second detection unit 20 that detects the document 2 in the conveying direction D1.

According to the above configuration, if the second document 2b is present when the first document 2a reaches the reading end position, for example, the image reading device 10 stops driving of the motor 17d in response to a stop instruction such as a cancel instruction, stops the first document 2a at the reading end position, and stops the second document 2b at the pre-reading position as illustrated in FIG. 5. As described above, if the second document 2b is stopped at the pre-reading position, the reading on the second document 2b is not started, and thus the second document 2b does not need to be taken out from the conveyance path 22, and the scanning of the second document 2b can be resumed as it is later.

Figure 6:
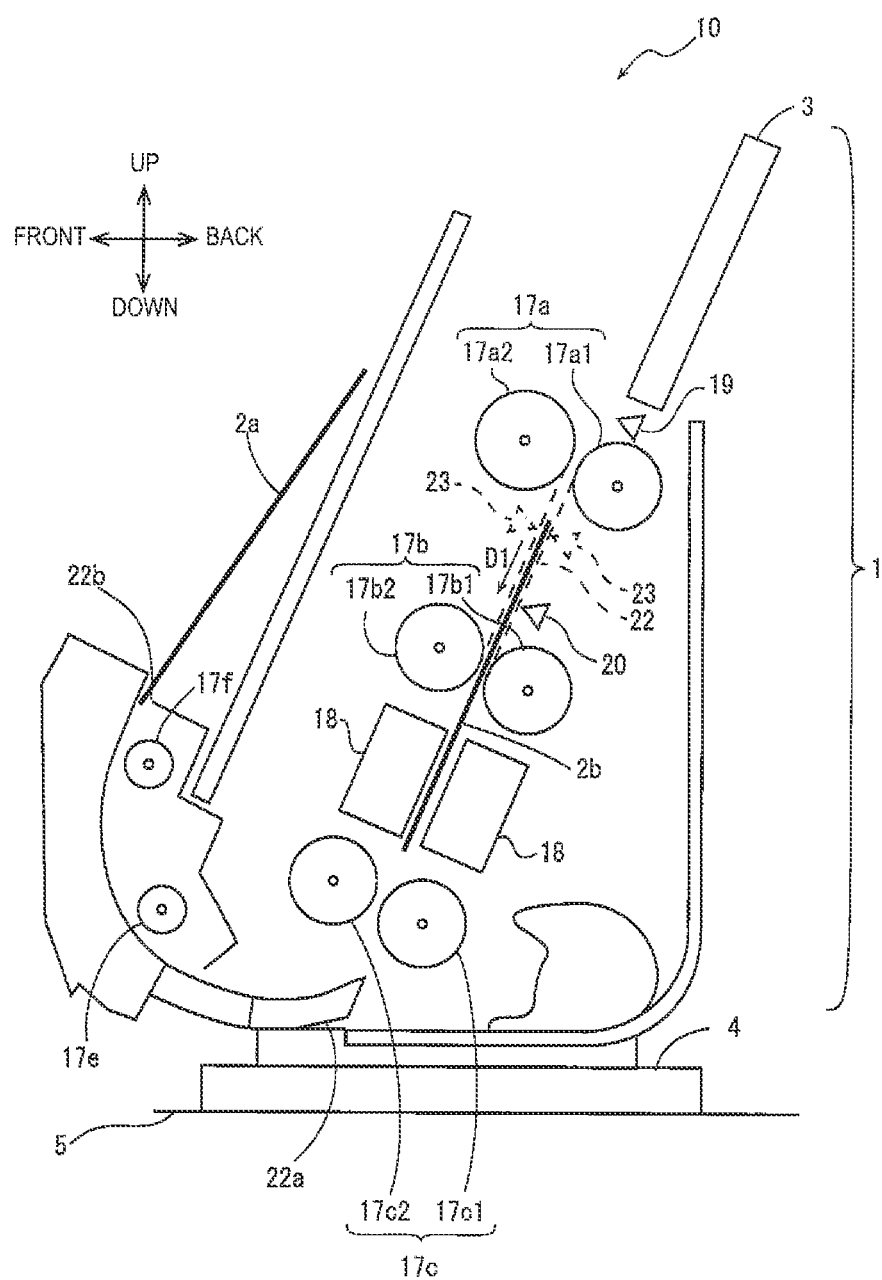
FIG. 6 is a diagram for explaining a problem, and is a diagram simply illustrating a state in which a first document is discharged and a second document is located downstream of a pre-reading position from a side viewpoint.

FIG. 6 is a diagram for explaining one of the problems assumed in the present case, and simply illustrates mainly the internal configuration of the image reading device 10 from a side viewpoint similarly to FIG. 2. It is assumed that the image reading device 10 has already received the cancel instruction at the time point of the state illustrated in FIG. 5. In this case, it is known that the image reading device 10 continues to perform conveyance, and discharges the first document 2a from the discharge port and stops the conveyance as illustrated in FIG. 6. With the discharge of the first document 2a, the conveyance of the second document 2b also proceeds, and as illustrated in FIG. 6, the second document 2b stops in a state where one part including the leading end has passed through the reading unit 18.

In the state of FIG. 6, the user needs to take out the second document 2b from the conveyance path 22 in order to resume scanning. In order to take out the second document 2b from the conveyance path 22, a procedure such as opening a cover on the front side which is a part of the housing of the main body 1 is required, which is complicated. According to the first embodiment, it is possible to stop the second document 2b at an appropriate position as illustrated in FIG. 5 without stopping the conveyance in the state of FIG. 6.

The position of the second detection unit 20 may be a position downstream of the conveyance roller pair 17b and upstream of the reading unit 18. In this case, the position of the document 2 when the leading end is located upstream of the second detection unit 20 and downstream of the feed roller pair 17a corresponds to the pre-reading position.

The first embodiment will be supplementarily described.

It is assumed that the control unit 11 receives the stop instruction after the first document 2a has passed the reading end position in a case where the document 2 is detected by the first detection unit 19. This corresponds to a case where a cancel instruction or a preview instruction is received during a period in which the process proceeds to "Yes" in step S210, "No" in step S220, and step S240 and the determination of "No" is repeated in step S200 in FIG. 4. In this case, unless the third document 2c that is the document 2 subsequent to the second document 2b is not detected by the first detection unit 19, the control unit 11 discharges the first document 2a and the second document 2b downstream of the second conveyance roller and then stops driving of the motor 17d. On the other hand, when the third document 2c is detected by the first detection unit 19, the control unit 11 discharges the first document 2a downstream of the second conveyance roller, stops the second document 2b at the reading end position, stops the third document 2c at the pre-reading position, and then stops driving of the motor 17d.

Figure 7:
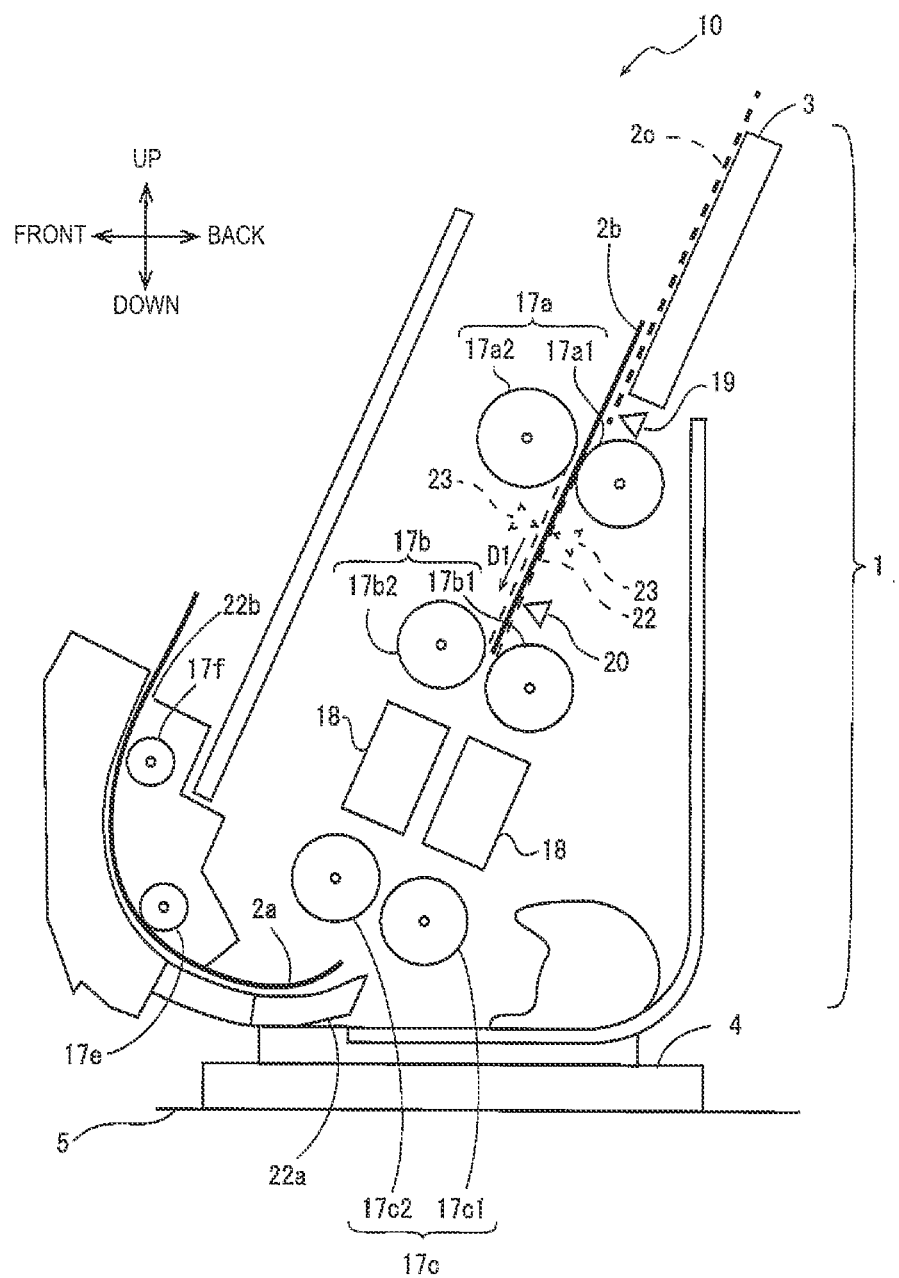
FIG. 7 is a diagram corresponding to the supplementary explanation of the first embodiment, and is a diagram simply illustrating a state in which a first document is located downstream of a reading end position and a second document is located downstream of a pre-reading position from a side viewpoint.
Figure 8:
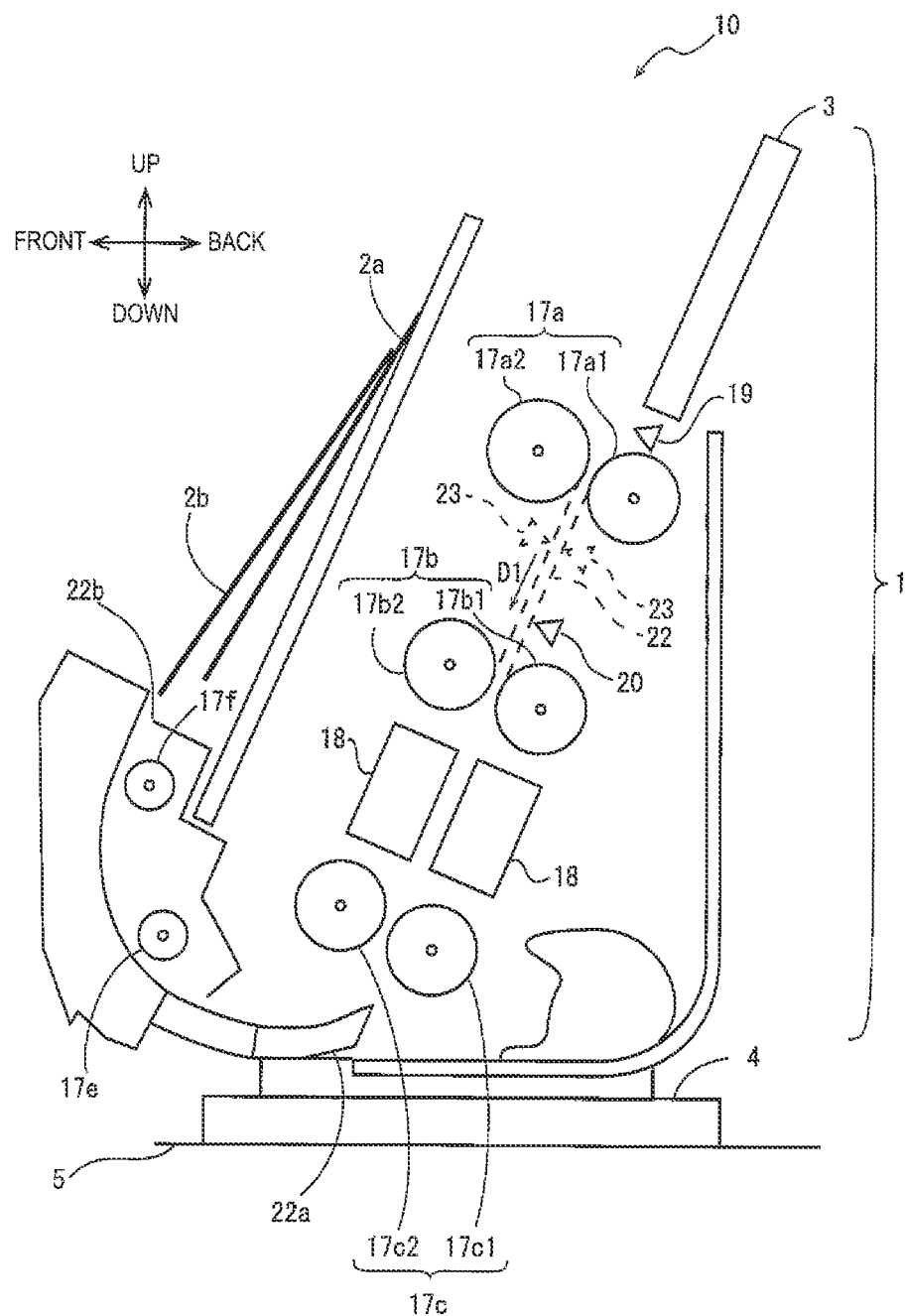
FIG. 8 is a diagram corresponding to a supplementary explanation of the first embodiment, and is a diagram simply illustrating a state in which a first document and a second document are discharged from a side viewpoint.
Figure 9:
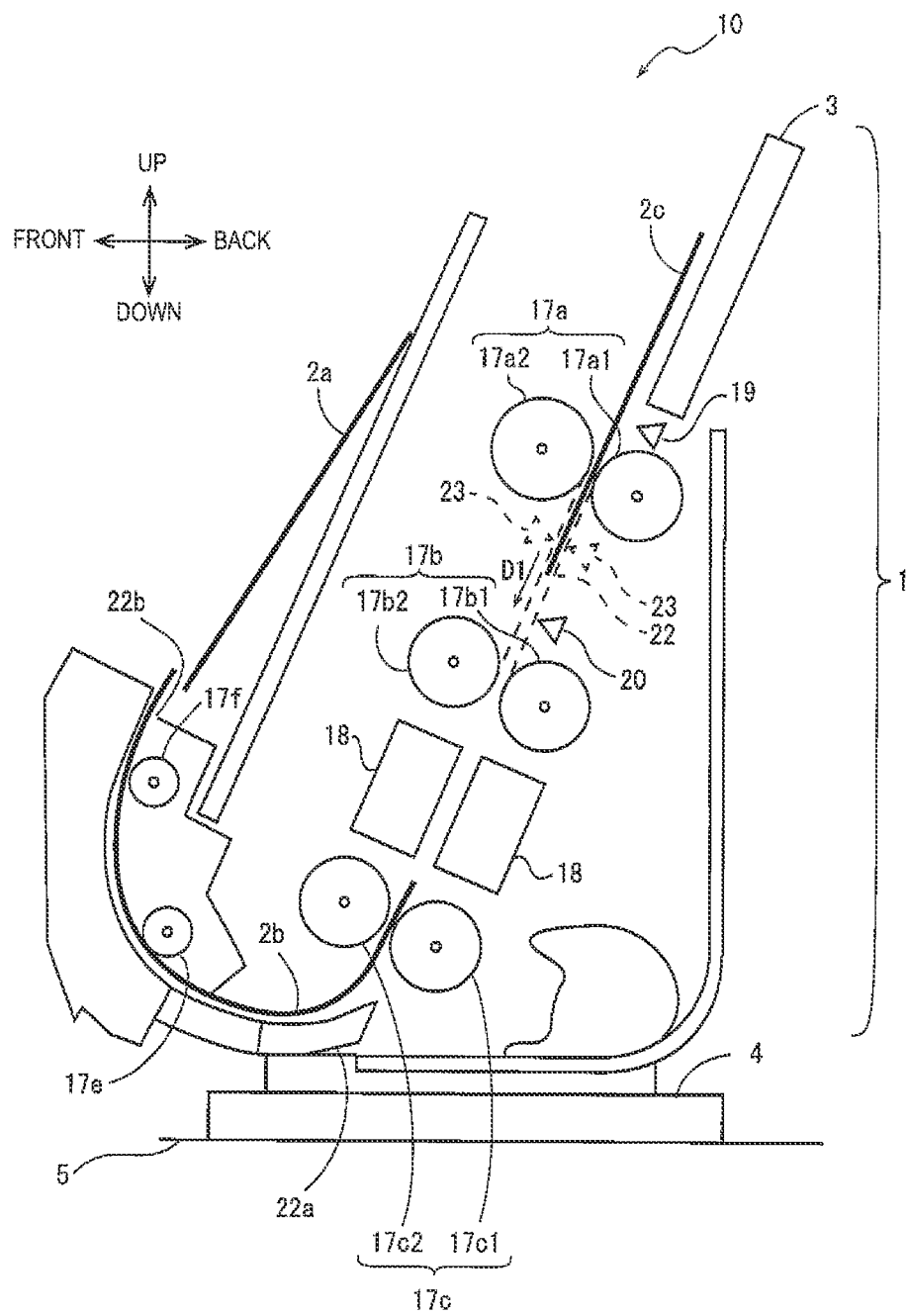
FIG. 9 is a diagram corresponding to the supplementary explanation of the first embodiment, and is a diagram simply illustrating a state in which a first document is discharged, a second document is at a reading end position, and a third document is at a pre-reading position from a side viewpoint.

FIGS. 7, 8, and 9 are diagrams corresponding to the supplementary explanation of the first embodiment, and simply illustrate mainly the internal configuration of the image reading device 10 from a side viewpoint similarly to FIG. 2. FIG. 7 illustrates a state in which the first document 2a being conveyed is located downstream of the reading end position and the second document 2b being conveyed is located downstream of the pre-reading position. This corresponds to a period after step S240 and before the second document 2b reaches the reading end position, that is, a period during which the determination of "No" is repeated in step S200.

It is assumed that the control unit 11 receives a cancel instruction at the timing illustrated in FIG. 7. In this case, in FIG. 7, if the third document 2c does not exist in the placement unit 3, the next document 2 is not detected by the first detection unit 19 after the trailing end of the second document 2b has passed through the first detection unit 19, and thus as illustrated in FIG. 8, the control unit 11 discharges the second document 2b following the first document 2a, and then stops driving of the motor 17d.

On the other hand, it is assumed that the control unit 11 receives the cancel instruction at the timing illustrated in FIG. 7 and the third document 2c exists in the placement unit 3. In this case, when the second document 2b reaches the reading end position, the control unit 11 proceeds the process to "Yes" in step S200, "Yes" in step S210, "Yes" in step S220, and step S230, and as illustrated in FIG. 9, discharges the first document 2a, and stops driving of the motor 17d in a state where the second document 2b is stopped at the reading end position and the third document 2c is stopped at the pre-reading position. As described above, according to the first embodiment, when receiving the stop instruction after the first document 2a has passed the reading end position, the control unit 11 can stop the second document 2b at the reading end position and stop the third document 2c at the pre-reading position. Therefore, the third document 2c does not need to be taken out from the conveyance path 22, and the user's trouble can be reduced.

4. Second Embodiment

Next, a second embodiment of the image reading device 10 will be described. In the second embodiment, the description made in the first embodiment is applied appropriately.

In the second embodiment, it is assumed that the main body 1 can switch the posture to the first posture described above or "second posture" in a state of being supported by the supporting portion 4.

Figure 10:
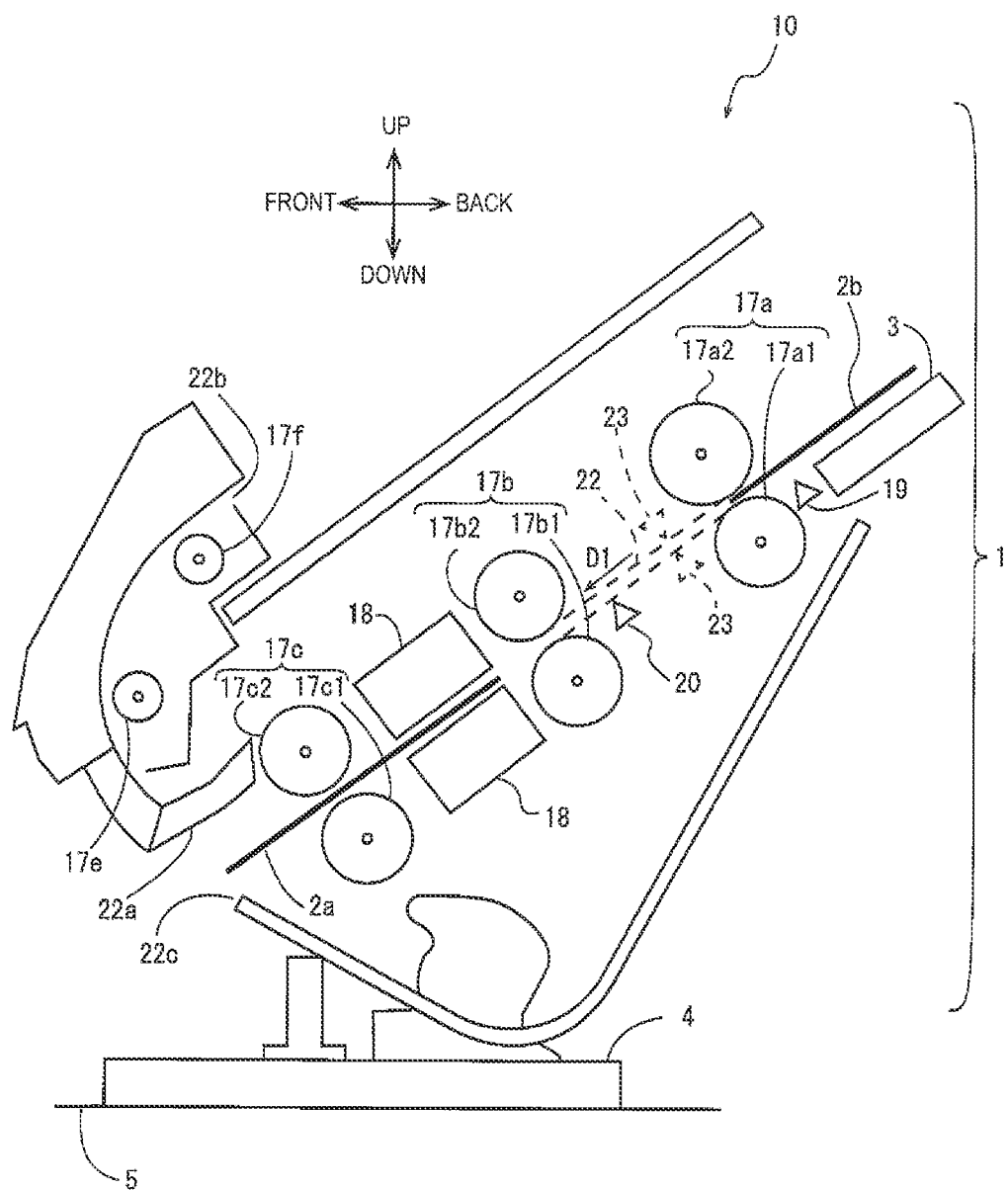
FIG. 10 is a diagram simply illustrating an internal configuration of an image reading device in a second posture from a side viewpoint.
Figure 12:
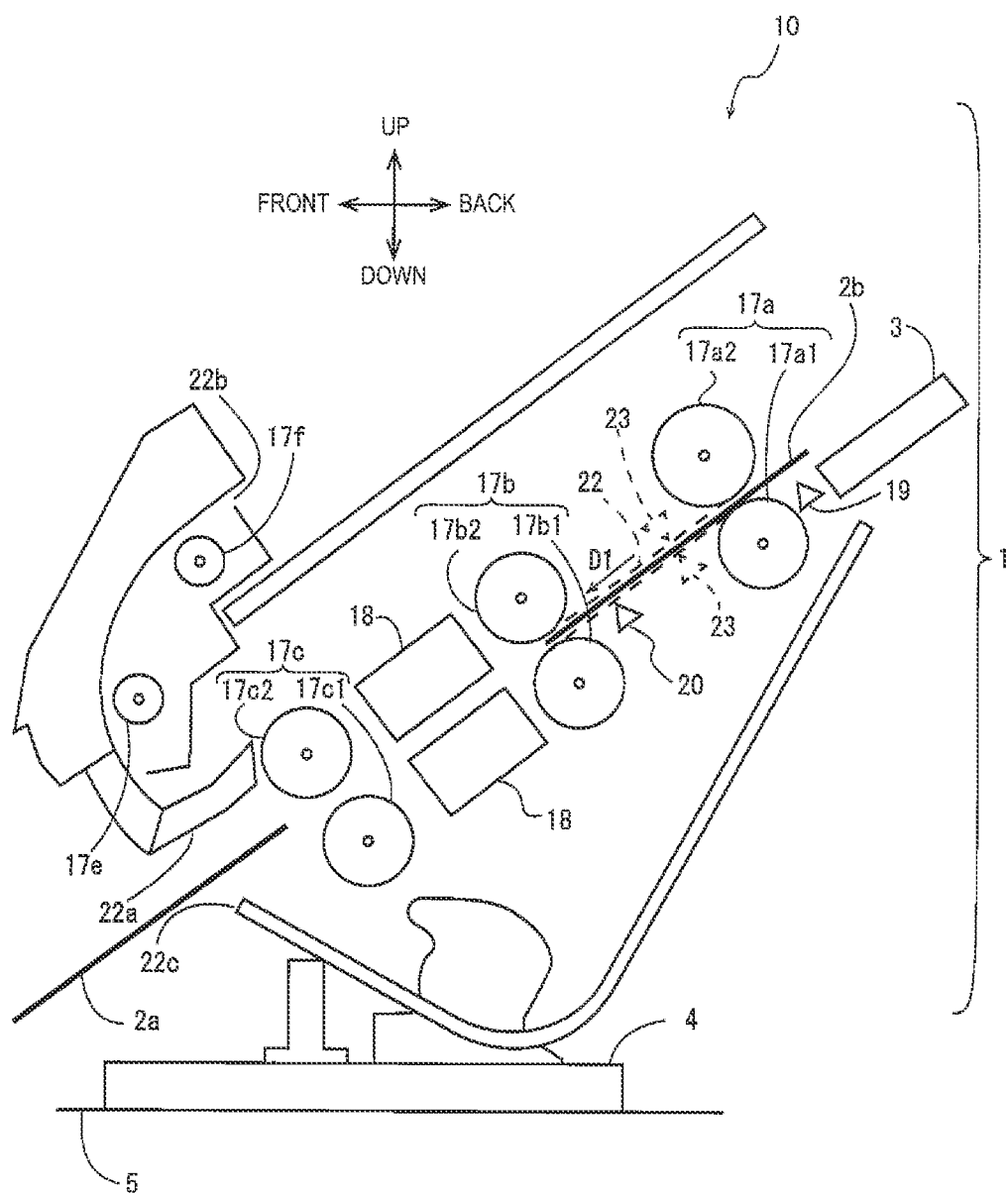
FIG. 12 is a diagram simply illustrating a state in which the first document is discharged and the second document is conveyed to some extent and stopped as a result of step S320 from a side viewpoint.

FIG. 10 simply illustrates mainly the internal configuration of the image reading device 10 from a side viewpoint, where the posture of the main body 1 is the second posture. The description common to FIG. 2 is appropriately omitted for FIG. 10 and FIG. 12 to be described later. The main body 1 illustrated in FIGS. 2 and 5 to 9 is in the first posture, but the main body 1 illustrated in FIGS. 10 and 12 is in the second posture in which the entire main body 1 is tilted backward as compared with the first posture.

The user can set the posture of the main body 1 to the first posture or the second posture by manually switching the angle of the main body 1 with respect to the supporting portion 4. In the sheet-feed-type scanner, a structure for switching the posture of the main body is known, and thus details are omitted, but the main body 1 is axially supported in a rotatable manner with respect to the supporting portion 4 at the portions on the back side and the lower side, and the main body 1 switches the posture by rotating around the axially supported portion.

As can be seen by comparing FIG. 10 with FIG. 2, in the second posture, some members forming the bottom surface of the curved path 22a are displaced so as to close the entrance of the curved path 22a. Such displacement of the member may be automatically performed in accordance with the switching to the second posture, or may be manually performed by the user. As a result, in the second posture, the document 2 cannot enter the curved path 22a, and instead, a second discharge port 22c is generated in the bottom surface of the housing of the main body 1. In the first posture, the document 2 is not discharged from the second discharge port 22c as the curved path 22a is hiding the second discharge port 22c. In the second posture, the document 2 conveyed downstream from the discharge roller pair 17c does not pass through the curved path 22a, and is discharged from the second discharge port 22c in a substantially straight trajectory similarly to the conveyance path 22 up to that time. In this manner, discharging the document 2 from the second discharge port 22c is referred to as "straight discharge".

As described above, the main body 1 can discharge the document 2 from the first discharge port 22b and cannot discharge the document 2 from the second discharge port 22c in the first posture, and can discharge the document 2 from the second discharge port 22c and cannot discharge the document 2 from the first discharge port 22b in the second posture. The posture detection unit 21 illustrated in FIG. 1 is a sensor that detects whether the posture of the main body 1 is the first posture or the second posture.

In a product switchable between the first posture and the second posture, straight discharge by the second posture is used for a document 2 that cannot be discharged in a U-turn, such as a hard material or a thick booklet, including a plastic card or a passport. Therefore, as in the known specification, when attempting to discharge the document 2 upon receiving a cancel instruction, if the document 2 is a plastic card, a passport, or the like and the main body 1 is in the first posture, the leading end of the document 2 comes into contact with the curved path 22a thus applying a load to the machine body and the document 2, and the document 2 may be damaged. In the second embodiment, the document 2 is appropriately stopped assuming such a problem.

Figure 11:
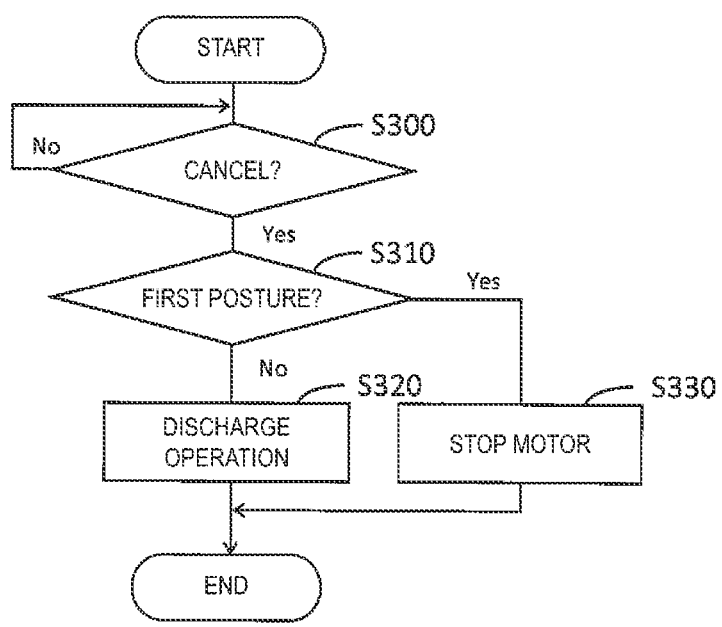
FIG. 11 is a flowchart illustrating a stop control process according to a second embodiment.

FIG. 11 is a flowchart illustrating a stop control process executed by the control unit 11 according to the program 12 in the second embodiment. As described above, the user operates the operation accepting unit 14 or the external device to instruct the image reading device 10 to start scanning the document 2. When the document 2 is placed in the placement unit 3, the control unit 11 that has received the scan start instruction starts driving of the motor 17d, causes the conveying unit 17 to start a process of conveying one sheet of document 2 from the placement unit 3, and starts the flowchart of FIG. 11.

In step S300, the control unit 11 continuously determines whether or not a cancel instruction has been received. If the process from reading to discharging of all the documents 2 set in the placement unit 3 is completed without receiving a cancel instruction from the user, the flowchart of FIG. 11 ends. When the cancel instruction is received, the process proceeds from the determination of "Yes" in step S300 to step S310.

In step 310, the control unit 11 determines whether or not the posture of the main body 1 is the first posture. The control unit 11 acquires the current detection result by the posture detection unit 21, and proceeds from the determination of "Yes" to step S330 if the first posture is detected, and proceeds from the determination of "No" to step S320 if the second posture is detected.

In step S320, the control unit 11 continues to drive the motor 17d, discharges the document 2 from the second discharge port 22c, stops driving of the motor 17d, and ends the flowchart of FIG. 11. Referring to FIG. 10, the first document 2a is being conveyed and read, and the second document 2b is placed in the placement unit 3. It is assumed that the user has input a cancel instruction in this state. In this case, it is considered that the reading of the first document 2a is canceled. Therefore, in step S320, as illustrated in FIG. 12, the control unit 11 continues to drive the motor 17d until the first document 2a is discharged from the second discharge port 22c, and then stops the motor 17d.

FIG. 2 is also used to describe step S330. Referring to FIG. 2, the first document 2a is being conveyed and read, and the second document 2b is placed in the placement unit 3. It is assumed that the user has input a cancel instruction in this state. In this case, in step S330, the control unit 11 immediately stops driving of the motor 17d and ends the flowchart of FIG. 11. That is, in the second embodiment, in the first posture as illustrated in FIG. 2, the control unit 11 stops the motor 17d immediately after recognizing that the cancel instruction has been received, and stops the document 2 in the state illustrated in FIG. 2.

According to FIG. 11, steps S300 and S310 correspond to a "determination step" of determining whether the posture is the first posture or the second posture when an instruction to cancel reading is received after the start of driving of the motor 17d. Furthermore, steps S330 and S320 correspond to a "stop control process" of stopping the driving of the motor 17d when the posture is the first posture, and continuing the driving of the motor 17d, discharging the document 2 from the second discharge port 22c, and stopping the driving of the motor 17d when the posture is the second posture.

As described above, according to the second embodiment, the image reading device 10 includes the supporting portion 4 that is placed at the installation surface 5 and supports the main body 1, and the main body 1 that is configured to switch the posture between the first posture and the second posture while being supported by the supporting portion 4. The main body 1 includes a motor 17d, a placement unit 3 in which the document 2 is placed, a feed roller that rotates by receiving power from the motor 17d to convey the document 2 placed in the placement unit 3 in a predetermined conveying direction D1, a first conveyance roller that is provided downstream of the feed roller in the conveying direction D1 and rotates by receiving power from the motor 17d to convey the document 2 in the conveying direction D1, a second conveyance roller that is provided downstream of the first conveyance roller and rotates by receiving power from the motor 17d to convey the document 2 in the conveying direction D1, a reading unit 18 that is provided between the first conveyance roller and the second conveyance roller in the conveying direction D1 and reads the conveyed document 2, a posture detection unit 21 that detects whether the posture is the first posture or the second posture, a first discharge port 22b that is provided downstream of the second conveyance roller to discharge the document 2 that passed through the curved path 22a, a second discharge port 22c that is provided downstream of the second conveyance roller to discharge the document 2 that does not pass through the curved path 22a, and a control unit 11. In the first posture, the main body 1 is configured to discharge the document 2 from the first discharge port 22b and not configured to discharge the document 2 from the second discharge port 22c, and in the second posture, the main body 1 is configured to discharge the document 2 from the second discharge port 22c and not configured to discharge the document 2 from the first discharge port 22b. When receiving an instruction to cancel reading after the start of driving of the motor 17d, the control unit 11 stops driving of the motor 17d if the first posture is detected by the posture detection unit 21, and continues driving of the motor 17d, discharges the document 2 from the second discharge port 22c, and stops the driving of the motor 17d if the second posture is detected by the posture detection unit 21.

According to the above configuration, when the posture of the main body 1 is the first posture, the control unit 11 stops the motor 17d immediately after recognizing that the cancel instruction has been received, and stops the conveyance of the document 2. Accordingly, in a case where the document 2 is a plastic card, a passport, or the like, generation of load or damage due to contact between the document 2 and the curved path 22a as described above is avoided. That is, the document 2 can be stopped at an appropriate position.

A modification of the second embodiment will be described.

First Modification

The image reading device 10 may include a "thickness detection unit" that detects the thickness of the document 2. Then, in a case where cancel instruction is received and the first posture is detected by the posture detection unit 21, the control unit 11 may stop driving of the motor 17d if the thickness detection unit detects a thickness of greater than or equal to a predetermined thickness.

The thickness detection unit may be a means or a sensor configured to detect the thickness of the document 2, and the control unit 11 may serve as all or a part of the thickness detection unit. In FIG. 2 and the like, a so-called multi-feed detection unit 23 is indicated by a broken line as an example of the thickness detection unit. The multi-feed detection unit 23 includes a transmission unit that transmits an ultrasonic wave and a reception unit that receives an ultrasonic wave, which face each other with the conveyance path 22 therebetween. Although not described in detail, when the ultrasonic wave transmitted by the transmission unit passes through the document 2 conveyed on the conveyance path 22, the ultrasonic wave attenuates according to the thickness of the document 2 including the presence or absence of multi-feeding of the document 2, so that the multi-feed detection unit 23 can detect the thickness of the document 2 according to the signal level of the ultrasonic wave received by the reception unit.

Alternatively, the thickness detection unit may detect the thickness of the document 2 by analyzing the length of the shadow of the document leading end generated in the image data in which the leading end of the document 2 is read.

Figure 13:
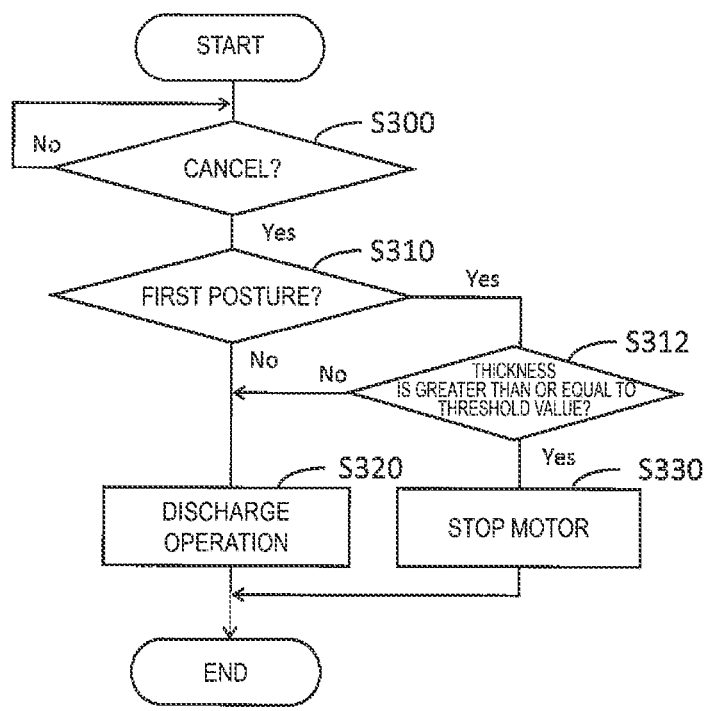
FIG. 13 is a flowchart illustrating a stop control process according to a first modification.

FIG. 13 is a flowchart according to a first modification. FIG. 13 is different from FIG. 11 in that the determination in step S312 is performed following "Yes" in step S310. In step S312, the control unit 11 determines whether or not the thickness of the document 2 detected by the thickness detection unit is greater than or equal to a predetermined thickness, that is, a predetermined threshold value. Then, if the thickness of the document 2 is greater than or equal to the threshold value, the process proceeds from "Yes" in step S312 to step S330, and if the thickness of the document 2 is less than the threshold value, the process proceeds from "No" in step S312 to step S320. According to the first modification, when the control unit 11 determines "Yes" in step S310 in the second embodiment and the document 2 is the document 2 having a thickness not suitable for U-turn discharge, the control unit 11 can immediately stop the motor 17d in step S330.

Second Modification

When receiving the cancel instruction and the first posture is detected by the posture detection unit 21, the control unit 11 may stop driving of the motor 17d if a plastic card or a passport is designated in advance as the type of document 2.

Figure 14:
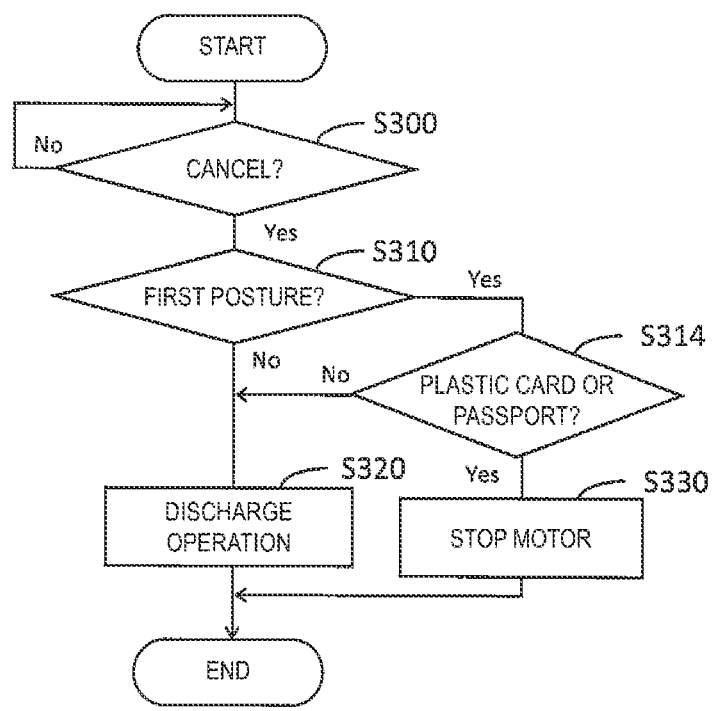
FIG. 14 is a flowchart illustrating a stop control process according to a second modification.

FIG. 14 is a flowchart according to a second modification. FIG. 14 is different from FIG. 11 in that the determination in step S314 is performed following "Yes" in step S310.

When instructing the image reading device 10 to start scanning, the user can designate the type of document 2 through the operation accepting unit 14 or the UI screen. Therefore, the control unit 11 may recognize the type of document 2 designated in advance by the user. In step S314, the control unit 11 determines whether or not a plastic card or a passport is designated in advance as the type of document 2. Then, if the plastic card or the passport is designated, the process proceeds from "Yes" in step S314 to step S330, and if neither the plastic card nor the passport is designated, the process proceeds from "No" in step S314 to step S320. According to such a second modification, when determining as "Yes" in step S310 in the second embodiment and when the document 2 is a plastic card or a passport not suitable for U-turn discharge, the control unit 11 can immediately stop the motor 17d in step S330.

It is of course possible to combine the first modification and the second modification. That is, the control unit 11 may execute step S330 on the condition that at least one of "Yes" in step S312 or "Yes" in step S314 is satisfied.

5. Other Descriptions

As the description of the first embodiment, FIGS. 2 and 5 to 9 all illustrate the main body 1 in the first posture, but in the first embodiment, the main body 1 may be in either the first posture or the second posture. That is, in the first embodiment, the image reading device 10 may be a product in which the posture of the main body 1 is fixed in the first posture, and on the contrary, may be a product in which the posture of the main body 1 is fixed in the second posture, or may be a product in which the posture of the main body 1 can be switched to the first posture or the second posture.

The first embodiment and the second embodiment can be combined.

Here, the image reading device 10 can switch the posture of the main body 1 between the first posture and the second posture, and the first embodiment will be referred to as "first control" and the second embodiment will be referred to as "second control". The control unit 11 can accept selection of the first control or the second control as the control to be executed when receiving an instruction to cancel reading as the stop instruction. That is, the user selects which of the first control and the second control is to be executed by the image reading device 10 that has received the cancel instruction through the operation accepting unit 14 or the UI screen in advance.

When the first control is selected, the control unit 11 adopts the first embodiment. That is, after the start of driving of the motor 17d and the first document 2a has reached the reading end position, whether or not the second document 2b is detected by the first detection unit 19 is determined, and when the second document 2b is detected by the first detection unit 19, if a cancel instruction has been received ("Yes" in step S220), the driving of the motor 17d is stopped. On the other hand, when the second control is selected, the control unit 11 adopts the second embodiment. That is, in a case where the cancel instruction is received after the start of the driving of the motor 17d, the driving of the motor 17d is stopped if the first posture is detected by the posture detection unit 21 ("Yes" in step S310), and the driving of the motor 17d is continued, the document 2 is discharged from the second discharge port 22c, and then the driving of the motor 17d is stopped if the second posture is detected by the posture detection unit 21 (step S310 "No").

In this manner, by allowing the user to select in advance the control to be executed by the image reading device 10 that has received the cancel instruction, convenience for the user is improved.

Note that, in the Claims, only some of the combinations of the claims are described, but as a matter of course, the present specification includes, not only one-to-one combinations of the independent claim and the dependent claim, but also various combinations of the plurality of dependent claims in the disclosed scope.

In addition to the image reading device 10, the present embodiment discloses the image reading method and the program 12 for executing the method in collaboration with the processor.

For example, an image reading method executed by the image reading device 10 can be grasped, the image reading device 10 including a motor 17d, a placement unit 3 on which a document 2 is mounted, a feed roller that receives power from the motor 17d and rotates to convey the document 2 placed at the placement unit 3 in a predetermined conveying direction D1, a first conveyance roller that is provided downstream of the feed roller in the conveying direction D1 and receives power from the motor 17d and rotates to convey the document 2 in the conveying direction D1, a second conveyance roller that is provided downstream of the first conveyance roller and receives power from the motor 17d and rotates to convey the document 2 in the conveying direction D1, and a reading unit 18 that is provided between the first conveyance roller and the second conveyance roller in the conveying direction D1 and reads the conveyed document 2, the image reading method including a determination step for determining presence or absence of a second document 2b that is a document 2 subsequent to the first document 2a, on the placement unit 3 after the first document 2a, which is the document 2, has reached a predetermined reading end position at which reading by the reading unit 18 ends after the start of driving of the motor 17d, and a stop control step for, when it is determined that the second document 2b is present, stopping the driving of the motor 17d if a stop instruction for stopping the document 2 at a specific position has been received, and continuing the driving of the motor 17d if the stop instruction has not been received, and when it is determined that the second document 2b is absent, discharging the first document 2a to downstream the second conveyance roller, and then stopping the driving of the motor 17d.

Furthermore, an image reading method executed by the image reading device 10 can be grasped, the image reading device 10 including a supporting portion 4 that is placed at an installment surface 5 to support a main body 1, and a main body 1 whose posture can be switched to a first posture of a second posture while being supported by the supporting portion 4, where the main body 1 including a motor 17d, a placement unit 3 on which a document 2 is mounted, a feed roller that receives power from the motor 17d and rotates to convey the document 2 placed at the placement unit 3 in a predetermined conveying direction D1, a first conveyance roller that is provided downstream of the feed roller in the conveying direction D1 and receives power from the motor 17d and rotates to convey the document 2 in the conveying direction D1, a second conveyance roller that is provided downstream of the first conveyance roller and receives power from the motor 17d and rotates to convey the document 2 in the conveying direction D1, a reading unit 18 that is provided between the first conveyance roller and the second conveyance roller in the conveying direction D1 and reads the conveyed document 2, a first discharge port 22b that is provided downstream of the second conveyance roller, and discharges the document 2 that passed a curved path 22a, and a second discharge port 22c that is provided downstream of the second conveyance roller and discharges the document 2 that does not pass the curved path 22a, and the main body 1 discharging the document 2 from the first discharge port 22b and not discharging the document 2 from the second discharge port 22c in a first posture, and discharging the document 2 from the second discharge port 22c and not discharging the document 2 from the first discharge port 22b in a second posture, the image reading method including a determination step for determining whether the posture is the first posture or the second posture when receiving an instruction to cancel reading after start of driving of the motor 17d, and a stop control step for stopping the driving of the motor 17d if the posture is the first posture and continuing the driving of the motor 17d and discharging the document 2 from the second discharge port 22c, and then stopping the driving of the motor 17d if the posture is the second posture.

What is claimed is:

1. An image reading device comprising:
   a motor;
   a placement unit on which a document is mounted;
   a feed roller that receives power from the motor to rotate to convey the document placed at the placement unit in a predetermined conveying direction;
   a first conveyance roller that is provided downstream of the feed roller in the conveying direction and receives power from the motor to rotate to convey the document in the conveying direction;
   a second conveyance roller that is provided downstream of the first conveyance roller and receives power from the motor to rotate to convey the document in the conveying direction;
   a reading unit that is provided between the first conveyance roller and the second conveyance roller in the conveying direction and reads the conveyed document;
   a first detection unit that detects the document at the placement unit; and
   a control unit; wherein
   the control unit determines, after start of driving of the motor and after a first document which is the document reaches a predetermined reading end position where reading by the reading unit ends, whether a second document that is a document subsequent to the first document is detected by the first detection unit;
   stops driving of the motor when a stop instruction for stopping the document at a specific position is received, and continues driving of the motor when the stop instruction is not received, in a case where the second document is detected by the first detection unit; and
   stops driving of the motor after the first document is discharged downstream of the second conveyance roller, in a case where the second document is not detected by the first detection unit.

2. The image reading device according to claim 1, wherein when the second document is detected by the first detection unit, the control unit, when the stop instruction is received, stops driving of the motor to stop the first document at the reading end position, and stops the second document at a pre-reading position where an end facing the downstream of the document is located between the feed roller and the first conveyance roller in the conveying direction and upstream of a second detection unit that detects the document in the conveying direction.

3. The image reading device according to claim 2, wherein when the second document is detected by the first detection unit and the stop instruction is received after the first document passes the reading end position, the control unit
stops driving of the motor after the first document and the second document are discharged downstream of the second conveyance roller when a third document that is the document subsequent to the second document is not detected by the first detection unit, and
discharges the first document downstream of the second conveyance roller, stops the second document at the reading end position, stops the third document at the pre-reading position, and then stops driving of the motor when the third document is detected by the first detection unit.

4. The image reading device according to claim 1, wherein the stop instruction is an instruction to cancel reading.

5. The image reading device according to claim 1, wherein the stop instruction is a preview instruction for displaying a reading result of the document on a predetermined screen.

6. The image reading device according to claim 1, further comprising:
a supporting portion that is placed at an installation surface and supports a main body; and
the main body configured to switch a posture to a first posture or a second posture while being supported by the supporting portion; wherein
the main body includes the motor, the placement unit, the feed roller, the first conveyance roller, the second conveyance roller, the reading unit, the first detection unit, and the control unit, and furthermore,
a posture detection unit that detects whether the posture is the first posture or the second posture,
a first discharge port that is provided downstream of the second conveyance roller and discharges the document that passed a curved path, and
a second discharge port that is provided downstream of the second conveyance roller and discharges the document that does not pass the curved path;
the main body is configured to discharge the document from the first discharge port and not discharge the document from the second discharge port in the first posture, and
configured to discharge the document from the second discharge port and not discharge the document from the first discharge port in the second posture; and
the control unit accepts selection of a first control or a second control as a control executed when receiving an instruction to cancel reading serving as the stop instruction,
determines, in a case where the first control is selected, whether or not the second document is detected by the first detection unit after start of driving of the motor and after the first document reaches the reading end position, and in a case where the second document is detected by the first detection unit, stops driving of the motor when the instruction to cancel is received, and
stops, in a case where the second control is selected, driving of the motor when the first posture is detected by the posture detection unit when the instruction to cancel is received after start of driving of the motor, and continues driving of the motor when the second posture is detected by the posture detection unit and stops driving of the motor after the document is discharged from the second discharge port.

7. An image reading device comprising:
a supporting portion that is placed at an installation surface and supports a main body; and
the main body configured to switch a posture to a first posture or a second posture while being supported by the supporting portion; wherein the main body includes:
a motor;
a placement unit on which a document is mounted;
a feed roller that receives power from the motor to rotate to convey the document placed at the placement unit in a predetermined conveying direction;
a first conveyance roller that is provided downstream of the feed roller in the conveying direction and receives power from the motor to rotate to convey the document in the conveying direction;
a second conveyance roller that is provided downstream of the first conveyance roller and receives power from the motor to rotate to convey the document in the conveying direction;
a reading unit that is provided between the first conveyance roller and the second conveyance roller in the conveying direction and reads the conveyed document;
a posture detection unit that detects whether the posture is the first posture or the second posture;
a first discharge port that is provided downstream of the second conveyance roller and discharges the document that passed a curved path;
a second discharge port that is provided downstream of the second conveyance roller and discharges the document that does not pass the curved path; and
a control unit; wherein
the main body is configured to discharge the document from the first discharge port and not discharge the document from the second discharge port in the first posture, and
configured to discharge the document from the second discharge port and not discharge the document from the first discharge port in the second posture; and
when receiving an instruction to cancel reading after start of driving of the motor, the control unit
stops driving of the motor when the first posture is detected by the posture detection unit, and
continues driving of the motor, and stops driving of the motor after the document is discharged from the second discharge port when the second posture is detected by the posture detection unit.

8. The image reading device according to claim 7, further comprising:
a thickness detection unit that detects a thickness of the document; wherein
when receiving the instruction to cancel and the first posture is detected by the posture detection unit, the control unit stops driving of the motor if a thickness greater than or equal to a predetermined thickness is detected by the thickness detection unit.

9. The image reading device according to claim 7, wherein when receiving the instruction to cancel and the first posture is detected by the posture detection unit, the control unit stops driving of the motor when a plastic card or a passport is designated in advance as the type of the document.

10. An image reading method executed by an image reading device, the image reading device including,
a motor,
a placement unit on which a document is mounted,
a feed roller that receives power from the motor to rotate to convey the document placed at the placement unit in a predetermined conveying direction,
a first conveyance roller that is provided downstream of the feed roller in the conveying direction and receives power from the motor to rotate to convey the document in the conveying direction,
a second conveyance roller that is provided downstream of the first conveyance roller and receives power from the motor to rotate to convey the document in the conveying direction, and
a reading unit that is provided between the first conveyance roller and the second conveyance roller in the conveying direction and reads the conveyed document, the image reading method comprising:
a determination step for determining, after a first document that is the document reaches a predetermined reading end position at which reading by the reading unit ends after the start of driving of the motor, presence or absence of a second document that is a document subsequent to the first document on the placement unit; and
a stop control step for, in a case where it is determined that the second document is present, stopping driving of the motor when a stop instruction for stopping the document at a specific position is received, and continuing the driving of the motor when the stop instruction is not received, and when it is determined that the second document is absent, discharging the first document downstream of the second conveyance roller, and then stopping driving of the motor.

11. An image reading method executed by an image reading device, the image reading device including,
a supporting portion that is placed at an installation surface and supports a main body, and
the main body configured to switch a posture to a first posture or a second posture while being supported by the supporting portion; the main body including,
a motor;
a placement unit on which a document is mounted;
a feed roller that receives power from the motor to rotate to convey the document placed at the placement unit in a predetermined conveying direction;
a first conveyance roller that is provided downstream of the feed roller in the conveying direction and receives power from the motor to rotate to convey the document in the conveying direction;
a second conveyance roller that is provided downstream of the first conveyance roller and receives power from the motor to rotate to convey the document in the conveying direction;
a reading unit that is provided between the first conveyance roller and the second conveyance roller in the conveying direction and reads the conveyed document;
a first discharge port that is provided downstream of the second conveyance roller and discharges the document that passed a curved path;
a second discharge port that is provided downstream of the second conveyance roller and discharges the document that does not pass the curved path; and
the main body configured to discharge the document from the first discharge port and not discharge the document from the second discharge port in the first posture, and configured to discharge the document from the second discharge port and not discharge the document from the first discharge port in the second posture; the image reading method comprising:
a determination step for determining whether the posture is the first posture or the second posture when receiving an instruction to cancel reading after start of driving of the motor; and
a stop control step for stopping driving of the motor when the posture is the first posture, and continuing driving of the motor, and stopping driving of the motor after the document is discharged from the second discharge port if the posture is the second posture.

* * * * *